United States Patent
Bates et al.

(10) Patent No.: US 6,745,367 B1
(45) Date of Patent: Jun. 1, 2004

(54) METHOD AND COMPUTER PROGRAM PRODUCT FOR IMPLEMENTING PARENTAL SUPERVISION FOR INTERNET BROWSING

(75) Inventors: Cary Lee Bates, Rochester, MN (US); Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/406,438

(22) Filed: Sep. 27, 1999

(51) Int. Cl.$^7$ .......................... G06F 15/00; G06F 17/00
(52) U.S. Cl. .................... 715/500; 715/501.1; 715/513; 709/224; 709/225; 709/229
(58) Field of Search ............................... 707/501.1, 513; 709/229, 224, 225; 715/501.1, 513

(56) References Cited

U.S. PATENT DOCUMENTS

| | | | | |
|---|---|---|---|---|
| 5,826,267 A | * | 10/1998 | McMillan ....................... | 707/9 |
| 5,835,722 A | * | 11/1998 | Bradshaw et al. .......... | 709/225 |
| 5,987,611 A | * | 11/1999 | Freund ........................ | 713/201 |
| 5,996,011 A | * | 11/1999 | Humes ........................ | 709/225 |
| 6,065,055 A | * | 5/2000 | Hughes et al. .............. | 709/229 |
| 6,233,618 B1 | * | 5/2001 | Shannon ...................... | 709/229 |
| 6,286,001 B1 | * | 9/2001 | Walker et al. .................. | 707/9 |
| 6,389,472 B1 | * | 5/2002 | Hughes et al. .............. | 709/229 |
| 6,446,119 B1 | * | 9/2002 | Olah et al. .................. | 709/224 |
| 6,526,424 B2 | * | 2/2003 | Kanno et al. ................ | 715/512 |

OTHER PUBLICATIONS

Hansen, Mark, "Internet controls: Protecting your children", Apr. 1998, Professional Safety, vol. 43, Issue 4, pp. 1–4.*

Gibbs, Mark, "Where do you think you're going?", Oct. 1998, Network World, vol. 15 Issue 40, pp. 57–58.*

Elliott et al., "Back talk: Net nanny protects family and free speech", Sep. 1998, Teacher Librarian, vol. 26 Issue 1, pp. 1–2.*

Boyle et al., "More Internet Utilities", May 1996, PC Magazine, vol. 15 No. 9, pp. 1–9.*

Shore, Joel, "Sneak Preview: Microsoft, Netscape Step Up Browser Wars: Internet Explorer 4.0, Memphis hit beta phase: Microsoft pair strong, but works in progress", Jul. 1997, Computer Reseller News, pp. 1–2.*

"Internet Security: Being Wired has Its Price", Sep. 1997, Computer Reseller News, pp. 1–5.*

Livingston, Brian, "IE 4.0 security made easy", Nov. 1997, Windows Sources, vol. 4, No. 11, pp. 1–3.*

* cited by examiner

Primary Examiner—Sanjiv Shah
Assistant Examiner—Almari Yuan
(74) Attorney, Agent, or Firm—Joan Pennington

(57) ABSTRACT

A method and computer program product are provided for implementing supervision functions for Internet browsing. A user profile record is maintained. A universal resource locator (URL) is identified. Approval is determined for the identified URL. The URL is displayed according to the user profile record. A view record is created and the screen is optionally captured at prescribed events and time intervals. The user profile record includes a display level, a URL history capture, and trust lists. The display level includes approved, monitored and restricted options. The URL history capture includes approved, monitored and restricted options and defined threshold values. Trusted URLs are allowed to delegate trust to links on their pages. URLs are allowed to inherit trust from a trusted URL. A supervised user may create an explanation for a bad choice to a history record. The trust lists include a list of approved web sites.

19 Claims, 17 Drawing Sheets

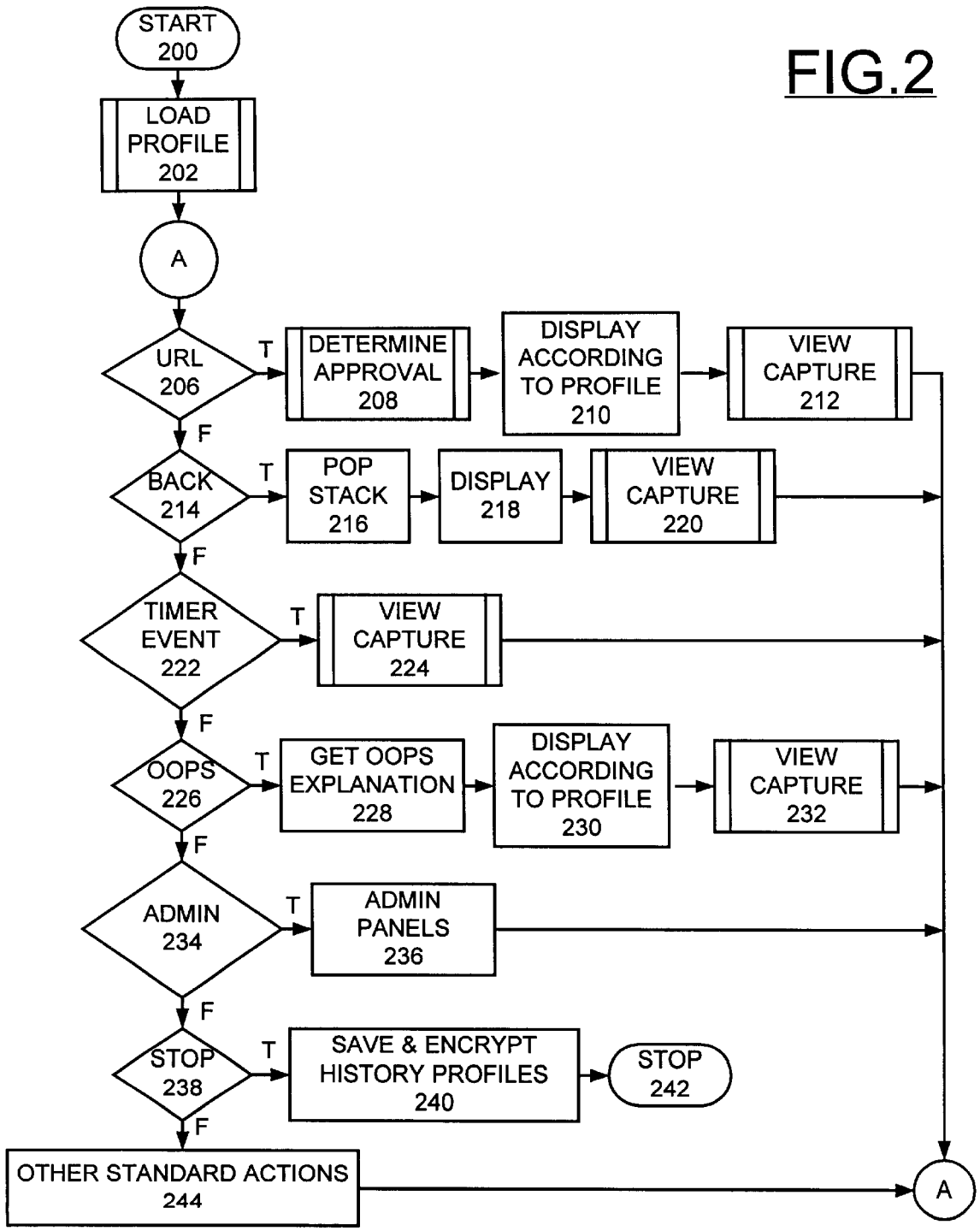

FIG. 7A

URL HISTORY RECORD 136

| URL 702 |
|---|
| TIME STAMP 704 |
| OOPS 706 |
| INHERITANCE FROM BASE 707 |
| TRUST BASE ENTRY 708 |
| APPROVAL 710 |
| REVIEWED 712 |

VIEW HISTORY RECORD 138

| URL 722 |
|---|
| TIME STAMP 724 |
| IMAGE 726 |
| INHERITANCE FROM BASE 727 |
| TRUST BASE ENTRY 728 |
| HTML 730 |
| REVIEWED 732 |
| OOPS 734 |
| APPROVAL 736 |

FIG. 7B

FIG. 8A
URL STACK 800
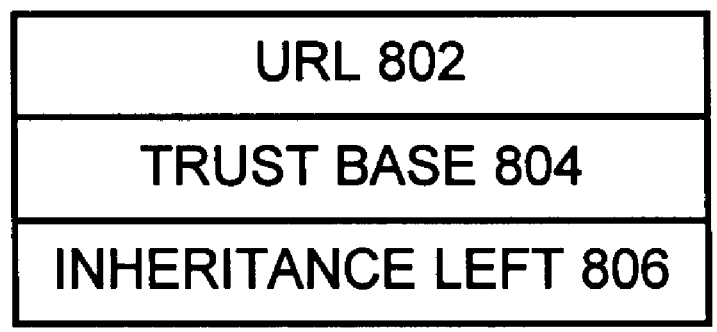
MEMORY 810
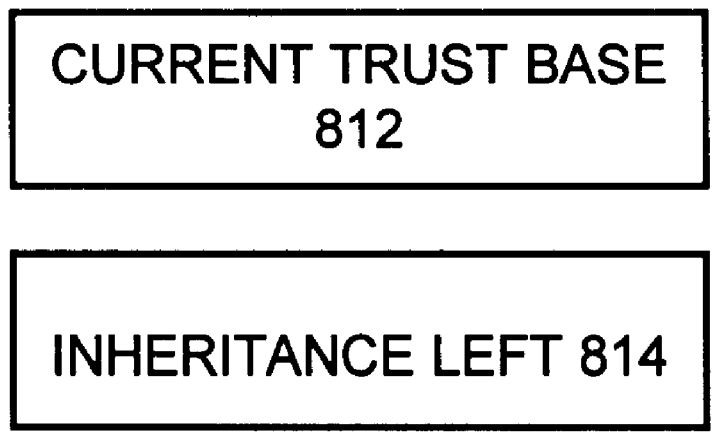
FIG. 8B

FIG. 10A
TRUSTED URL RECORD 1000
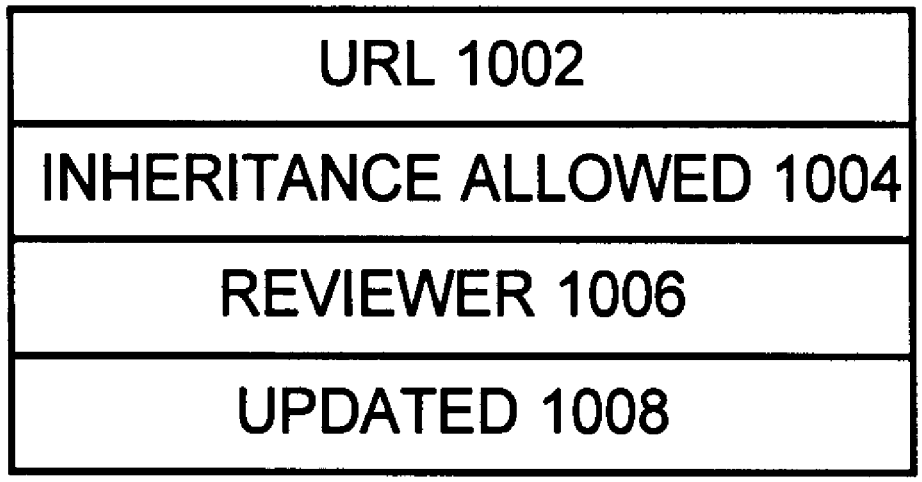
RESTRICTED URL RECORD 1010
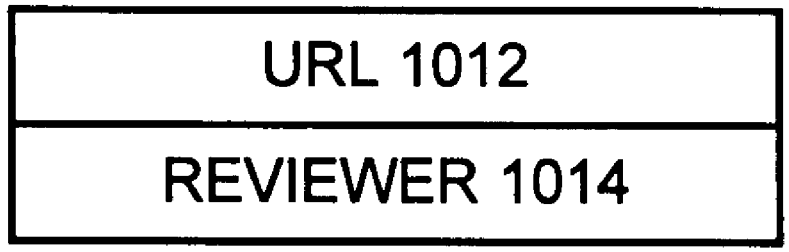
FIG. 10B

| USER PROFILE EDITOR 1100 | |
|---|---|

USER ID   [CHILD 1]

DISPLAY LEVEL   ○ APPROVED ONLY
                ● MONITORED
                ○ RESTRICTED

URL HISTORY: CAPTURE:
   ☐ APPROVED
   ☐ MONITORED
   ☐ RESTRICTED

VIEW: CAPTURE:   ☐ APPROVED
                 ☐ MONITORED
                 ☐ RESTRICTED
                 ☐ STAY OVER      [30]  SECONDS
                 ☐ TIME INTERVAL  [120] SECONDS
                 ☐ CAPTURE OOPS
                 ☐ KEEP HTML
                 ☐ KEEP ENTIRE SCREEN
                 ☐ KEEP BROWSER VIEW ONLY
                 ☐ DISPLAY MESSAGE ON "RESTRICTED"

TRUST LISTS

| CONCERNED_PARENTS.LST | ADD |
| APPROVED_WEB_SITES.LST | REMOVE |
|  | EDIT |

REVIEW   ☐ AFTER [120] HISTORY RECORD
         ☐ AFTER [5]   OOPS
         ☐ AFTER [50]  VIEW RECORDS
         ☐ AFTER [14]  DAYS
         ☐ AFTER [10]  RESTRICTED EVENTS

VIEW HISTORY FILE   [C:/HISTORY/CHILD1VIEW.HST]  [......]

URL HISTORY FILE    [C:/HISTORY/CHILD1URL.HST]   [......]

FIG.11

TRUST LIST EDITOR 1200

TRUSTED URLS

| URL | INHERITANCE | REVIEWER |
|---|---|---|
| WWW.YAHOOLI.... | 99 | ME |
| WWW.KIDSCOR.... | 99 | ME |
| WWW.NEWSWIR... | 95 | ME |

- ADD
- REMOVE
- EDIT

RESTRICTED

| URL | REVIEWER |
|---|---|
| WWW.SEXSTUFF.COM | ME |

- ADD
- REMOVE
- EDIT

FIG.12

METHOD AND COMPUTER PROGRAM PRODUCT FOR IMPLEMENTING PARENTAL SUPERVISION FOR INTERNET BROWSING

FIELD OF THE INVENTION

The present invention relates generally to the data processing field, and more particularly, relates to a method and computer program product for implementing parental supervision for Internet browsing.

DESCRIPTION OF THE RELATED ART

The Internet is a major source of information and entertainment for a growing number of people. Parents, having responsibility for minor children, need to monitor and control what their children are accessing over the Internet.

Parents need better ways to monitor what their children are browsing on the Internet. Current art provides a measure of control through censoring or filtering certain sites based on a Universal Resource Locator (URL). However, current censoring software is not infallible and can allow undesirable material. Lists are never totally complete; images cannot be analyzed for content; lists go out of date because bad sites are proliferating and changing, often with the intent of outsmarting filtering programs. Available censoring programs sometimes prohibit good sites that are not wanted to be filtered.

Thus many parents opt to monitor usage in addition to, or instead of censoring software only. Current art provides monitoring through logging of URLs visited. Current logs of visited URLs have limitations. They provide time stamps and URLs, but no images. The URLs are not always descriptive, and the large number of URLs in a log make revisiting each URL impractical. Current logs require consistent review by a parent, but a parent is not always aware when greater Internet usage is taking place. Thus logs are often not effective, even when kept because review is inconsistent or not thorough. Since parents have difficulty controlling what the child views outside of the home, many parents hope to teach children proper viewing behavior within the home and develop trust in a child's viewing choices. However, the weaknesses of current logging are even more apparent, here. The sooner after an infraction a parent can catch a bad choice after viewing, the better for training, but because the parent may be unaware of a bad choice and because of the difficulty in monitoring using current logs, the teaching opportunity is missed and the benefit lost.

A need exists for an improved method and computer program product for implementing parental supervision for Internet browsing. It is desirable to provide parents with an effective mechanism for monitoring what their children view. It is desirable to provide an improved method and computer program product which more approximates a parent looking over the shoulder of a child, such that the parent can more quickly understand what the child is viewing and more quickly and effectively work with bad choices the child is making.

SUMMARY OF THE INVENTION

A principal object of the present invention is to provide a method and computer program product for implementing parental supervision for Internet browsing. Other important objects of the present invention are to provide such method and computer program product for implementing parental supervision for Internet browsing substantially without negative effect and that overcome many of the disadvantages of prior art arrangements.

In brief, a method and computer program product are provided for implementing supervision functions for Internet browsing. A user profile record is maintained. A universal resource locator (URL) is identified. Approval is determined for the identified URL. The URL is displayed according to the user profile record. A view record is created.

In accordance with features of the invention, the user profile record includes a display level, a URL history capture, and trust lists. The display level includes approved, monitored and restricted options. The URL history capture includes approved, monitored and restricted options and defined threshold values. The trust lists include a list of approved web sites.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, 3, 4, 5, 6A, 6B, and 6C are flow charts illustrating exemplary steps for implementing parental supervision for Internet browsing in accordance with the preferred embodiment;

FIGS. 7A and 7B are diagrams respectively illustrating a URL history record and a view history record in accordance with the preferred embodiment;

FIGS. 8A and 8B are diagrams respectively illustrating a URL stack and a memory in accordance with the preferred embodiment;

FIGS. 10A and 10B are diagrams respectively illustrating a trusted URL record and a restricted URL record in accordance with the preferred embodiment;

FIG. 11 is a diagram illustrating a user profile editor in accordance with the preferred embodiment;

FIG. 12 is a diagram illustrating a trust list editor in accordance with the preferred embodiment;

DETAILED DESCRIPTION OF THE PREFERRED EMBODIMENTS

Figure 1A:
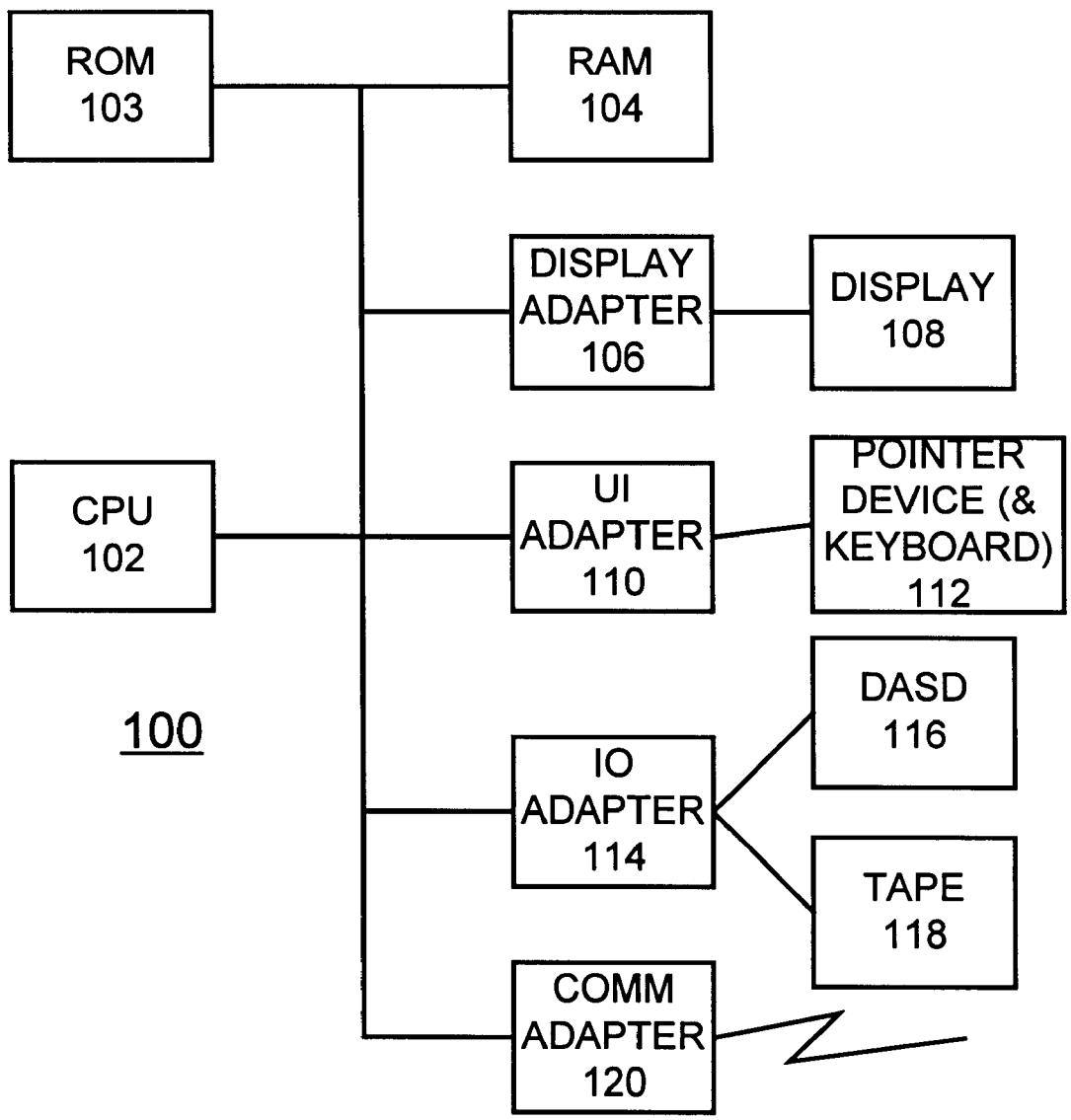
FIGS. 1A and 1B are block diagram representations illustrating a computer system and operating system for implementing a method and computer program product for implementing parental supervision for Internet browsing in accordance with the invention.
Figure 1B:
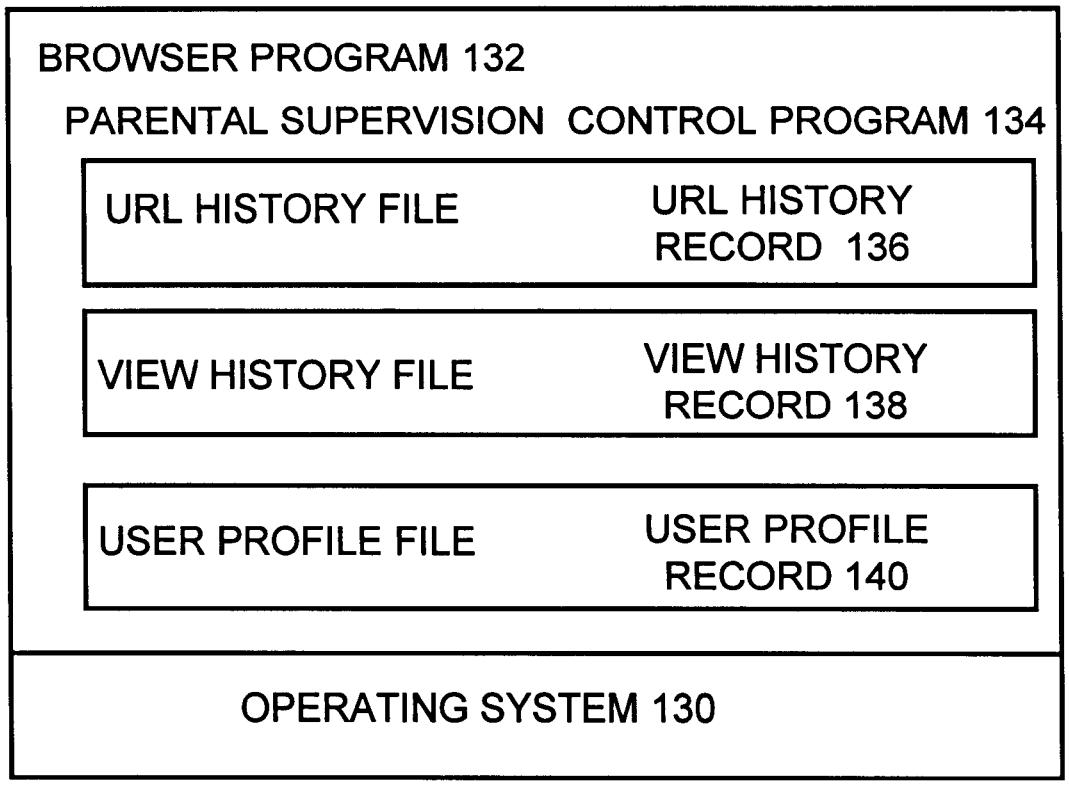

Having reference now to the drawings, in FIGS. 1A and 1B, there is shown a computer or data processing system generally designated by the reference character 100 for carrying out the parental supervision control methods of the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, a browser program 132 and a parental supervision control program 134 of the preferred embodiment. URL history record 136, view history record 138 and user profile record 140 are stored in accordance with the parental supervision methods of the preferred embodiment.

Various commercially available computers can be used for computer system 100, for example, an IBM personal computer. CPU 102 is suitably programmed by the parental supervision control program 134 to execute the flowcharts of FIGS. 2, 3, 4, 5, 6A, 6B, and 6C.

In accordance with features of the preferred embodiment, the parental supervision control program 134 enables parents to sway their children from visiting undesirable sites, and to be aware of sites visited and take appropriate action. A filtered version of the history file of sites visited in browser 132 is saved using the view history record 138. New and efficient functions not currently available are provided. Once children realize that their parents can efficiently monitor what they are surfing, they will be careful where they go. And just having the parental supervision control program 134 will deter, even if the parent rarely uses it.

In accordance with features of the preferred embodiment, the parental supervision control program 134 provides an inverse filter function. Instead of maintaining a list of undesirable sites that are to be filtered, an approved or trust list is maintained of good sites that need not be monitored. Once a site is approved, parental monitoring is not needed for that site, the overhead of the monitoring functions described below is removed. At first this list may seem unmanageably large. However, several things are in its favor: First, most people only browse a relatively small number of sites on a regular basis. This list only tracks sites that are actually visited, thus keeping the number low. Second, the entire list need not be local. All or portions of this list can be shared with other users via servers, network drives, or Internet sites. Normally, the user is not prohibited from visiting sites outside this approved or trust list, but he will be aware that new sites will be subject to monitoring by an authority figure or administrator. A display approved only option is provided, whereby the user is prohibited from visiting any site not on the approved list. This feature gives parents maximum authority to strictly control where a child can go, until the parent explicitly updates the approved list. Normally, this option is not practical for the parent, but in some situations it is useful, such as for correction, or for classroom situations where other kids are under your supervision.

In accordance with a link filter function of the preferred embodiment, any site that is directly linked from an approved site may be automatically an approved site, without explicitly listing it in the approved filter or trust list. For example, I may trust a home page and all sites that are directly linked from that page, so that I only need to put the home page into the filter and set the trust inheritance to 1. Second generation links, or more, that could inherit the filter of the first generation site are also possible.

In accordance with a feature of the preferred embodiment, a function is provided to automatically log to the archive file from the history file before the history file is purged, so that the user cannot purge the history file to erase his tracks. The archive file is protected so that only the parent or authority figure can access it.

An OOPS option allows a monitored child to provide explanation for sites accidentally visited that the parent would not approve. Thus the child can be given more or less freedom by demonstrating responsibility for sites visited.

Other features of the preferred embodiment enable window archive and rapid playback. When new sites are visited that are not in the approved list, not only are the addresses or URLs archived, each window that is downloaded and brought into focus is also archived, with the following monitoring functions. Rapid playback feature enables the parent at monitor time to rapidly scan the windows, for example, three per second to quickly see what the site is about, without downloading the windows because the windows are saved locally. The human eye can see windows at an amazingly fast rate (evidenced by TV clips that flip through many scenes very rapidly). If something looks suspicious, the parent can slow down the view rate. Using lossy compression techniques, the entire window image is captured at a reasonable storage cost. The archive storage medium need not be expensive storage, but can be high capacity diskette, tape, or other less expensive medium. For example, an inexpensive VCR tape can store six hours of video. Another monitoring function is a time-at-site option. With this time-at-site option, a window snapshot is made and archived at a constant rate, for example, once every 15 seconds, so that if the user stays at a window for a long time, during rapid playback the parent will view that window for a longer period of time. If the user only stayed at the window a short time, that window will flash by more quickly. This tells the parent very efficiently how long the kid was looking at a window, without having to study time logs, charts or graphs.

Other features of the preferred embodiment enable navigation and an option to add a site to the approved list once it has been reviewed, so it need not be monitored again. An option is provided to add a site to a disapproved list, for a traditional filter function, so that this site cannot be visited again. Remind triggers are provided to remind the parent that it is time to monitor. Trigger times include when the storage on the archive medium reaches a threshold; when the number of sites visited reaches a threshold; when a date/time alarm fires, such as once a week. Other triggers can be used, such as based on word counts, lists of web sites that will cause a trigger, and the like.

Referring to FIG. 2, there are shown illustrative steps for implementing parental supervision control in accordance with the preferred embodiment. In FIG. 2 exemplary steps for implementing parental supervision are shown starting at a block 200. A load profile routine is performed to load a user profile record, and if the user is an administrator optionally review history, as indicated in a block 202 and described further by FIG. 3. A user profile record 140 is illustrated and described with respect to FIG. 9. Following entry point A, checking for a universal resource locator (URL) is performed as indicated in a decision block 206. The URL at block 206 may be entered, bookmarked or hyper-link selected. When a URL is identified at block 206, a determine approval routine is performed as indicated in a block 208. Each URL is either designated as approved, monitored, or restricted. Then a display according to profile routine is performed as indicated in a block 210, where the URL is displayed for the user if allowed according to profile settings. If display level 904 (FIG. 9) of the user profile is approved, the user will only be shown URLs determined in block 208 to be approved. If display level 904 is monitored, the user is shown URLs only if determined in block 208 to be approved or monitored. If display level 904 is restricted, any URL will be shown. Next a view capture routine is performed as indicated in a block 212, where the screen or portions are captured for later historical viewing. Checking for a back selection is performed as indicated in a decision block 214. If true, then a pop stack operation is performed as indicated in a block 216. The pop stack operation restores both the stack and inheritance left and current trust base. Current trust base is a URL whose hyperlinks are trusted because of the trusted URL reputation. Subsequent links inherit a trust level from this base URL. Trust level is the number of links that can be taken from the current trust base and still be trusted. For example, if the Walt Disney home page is the current trusted base, and you can trust a link from here to another page, and any link from that page as well, then the trust level is 2. This trust is extended as many links from the base as specified in the trust list that is illustrated in FIG. 12. Inheritance left is the number of links remaining in the trust level after subtracting the number of links taken away from the trust base. Next the back URL selection is displayed as indicated in a block 218. Next the view capture routine is performed as indicated in a block 220. Otherwise, checking for a timer event is performed as indicated in a decision block 222. When a timer event, such as an elapsed time since the last view capture, or the fact user has stayed at a particular URL for an extended time, is identified, then the view capture routine is performed as indicated in a block 224. When a timer event is not found, then checking for an OOPS event, where an OOPS event is the child pressing the OOPS button acknowledging a bad selection has been made, is performed as indicated in a decision block 226. If found, then the OOPS explanation is obtained as indicated in a block 228. The display according to profile routine is performed as indicated in a block 230. Next the view capture routine is performed as indicated in a block 232. When an OOPS event is not found, checking for an administration event is performed as indicated in a decision block 234. If true, then administration panels are processed, for example, to edit trust list, edit user profile, and view history. When an administration event is not found, checking for a stop selection or exit browser is performed as indicated in a decision block 238. If stop is identified, then history profiles are saved and encrypted as indicated in a block 240. This completes the sequential operations as indicated in a block 242 and the program exits. Otherwise, other standard actions are performed as indicated in a block 244. Then the sequential operations return to entry point A.

Figure 3:
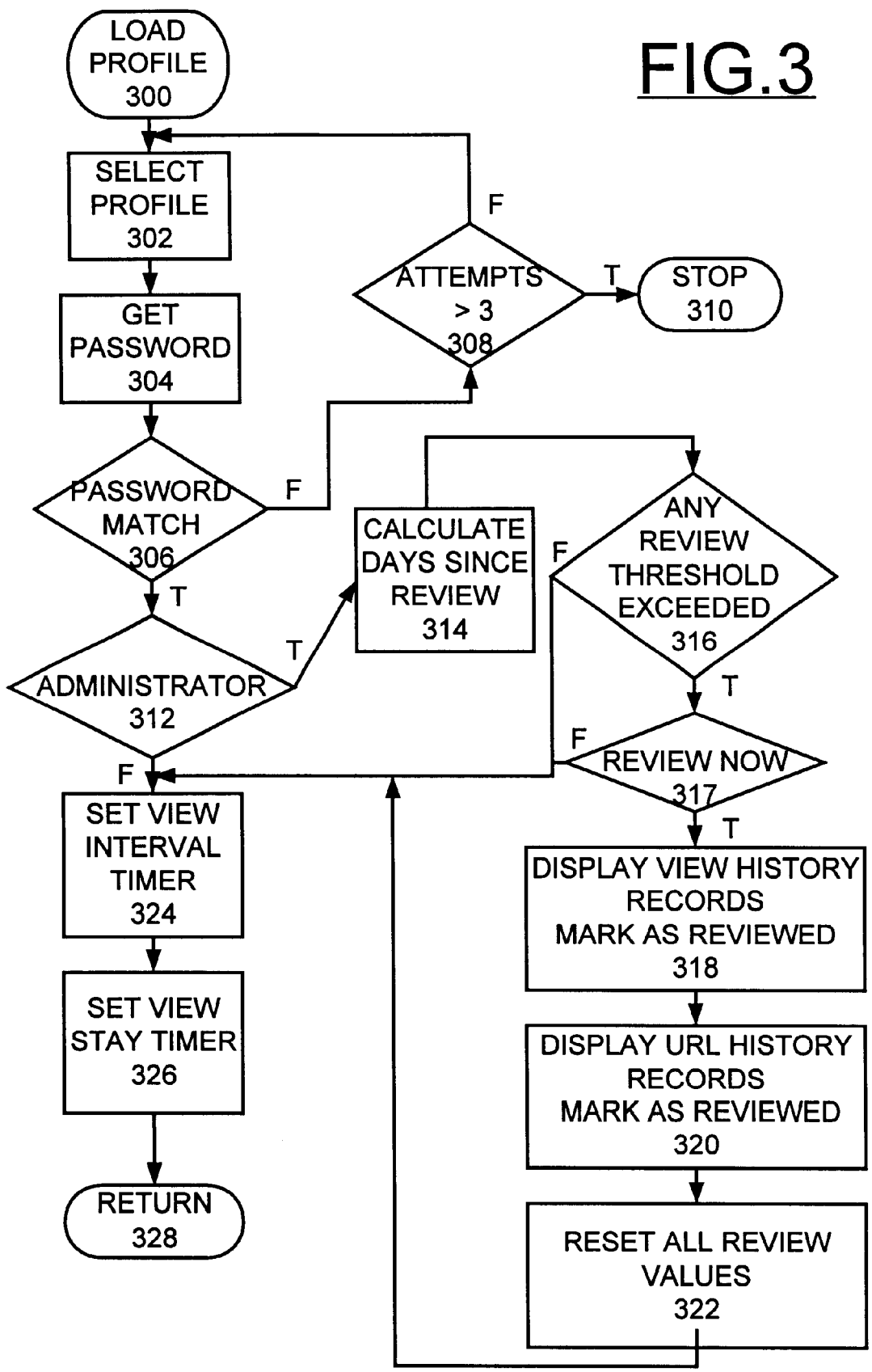

Referring to FIG. 3, there are shown illustrative steps for the load profile routine starting at block 300. A profile is selected based on user name or ID as indicated in a block 302. A password is obtained as indicated in a block 304. The password and profile are provided so that the supervision functions can ge targeted to individuals. For example, a child would have different supervision than an adult or spouse. Checking for a password match is performed as indicated in a decision block 306. If a match is not found, checking whether the attempts is greater than 3 is performed as indicated in a decision block 308. If true, then the sequential operations end and the program exits as indicated in a block 310. Otherwise the sequential operations return to block 302. When a password match is found at block 306, then checking for an administrator is performed as indicated in a decision block 312. An administration should be notified if it is time to review the history. If an administrator is found, then a number of days since the last review is calculated as indicated in a block 314. Checking whether any review threshold has been exceeded is performed as indicated in a decision block 316. A review threshold exceeded indicates that data has been collected or time has elapsed such that the administrator wished to review history under such circumstances. In block 317 the administrator is asked whether they wish to review history now. If not flow continues to block 324. If so, then view history records are displayed and marked as reviewed as indicated in a block 318. Next URL history records are displayed and marked as reviewed as indicated in a block 320. All review values are reset as indicated in a block 322. After the review values are reset and when no review threshold has been exceeded or if the administrator does not wish to review now, then the view interval timer is set as indicated in a block 324. The view interval timer goes off at a profile set interval to cause periodic collection of historic data. Next a view stay timer is set as indicated in a block 326 and the sequential operations return as indicated in a block 328. The view stay timer goes off if the user has been looking at a URL for a sufficiently long time.

Figure 4:
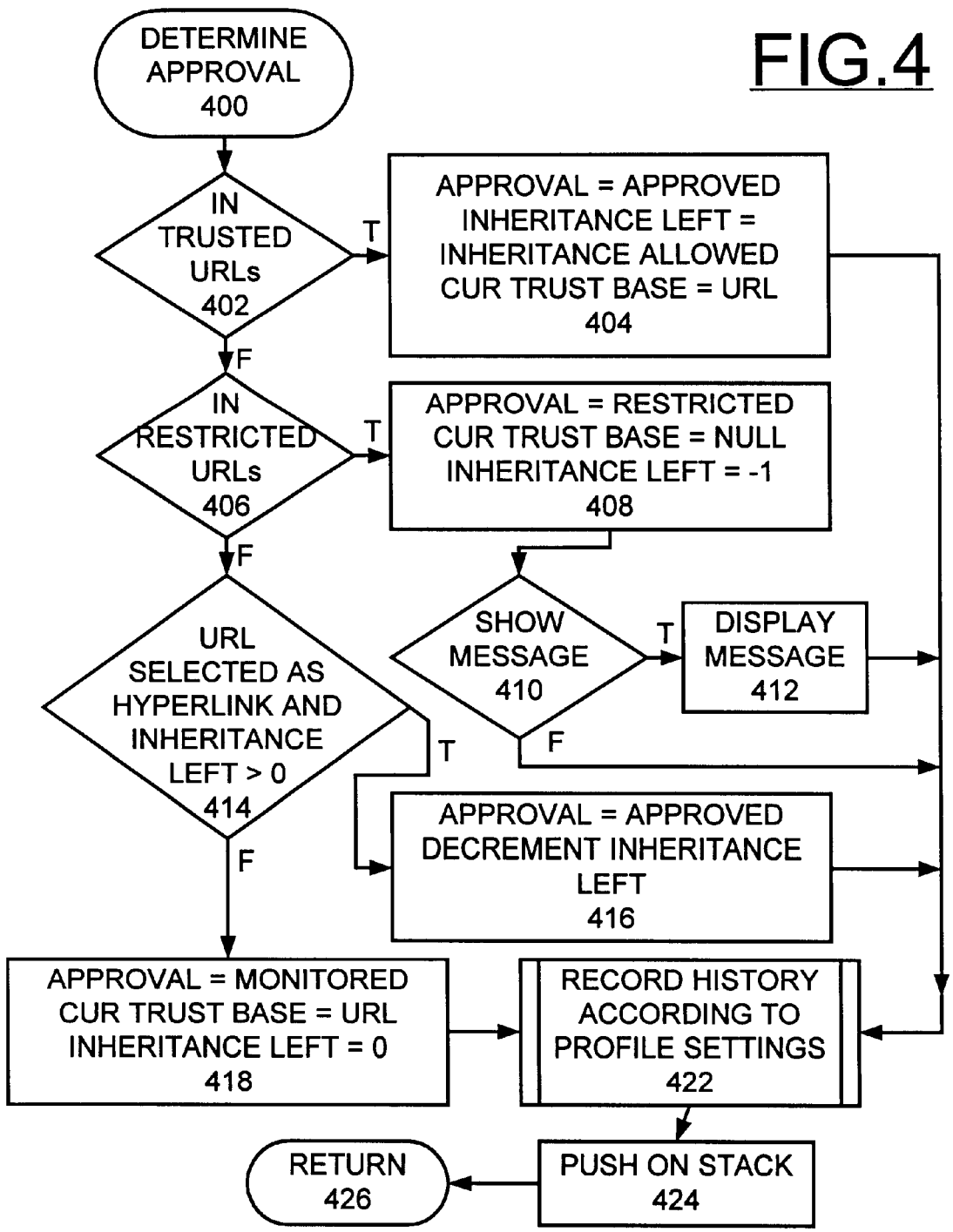

Referring to FIG. 4, there are shown illustrative steps for the determine approval routine starting at block 400. Checking whether the URL is in the trusted URLs is performed as indicated in a decision block 402. The trust list is composed of both approved sites and restricted sites. If a trusted URL, approval is set to approved, inheritance left is set to the inheritance allowed of the trusted URL in the trusted URL record, and the current trust base is set as the URL as indicated in a block 404. A trusted URL is allowed to extend approval to links on its page. This trust can in turn be extended to other links to the limited number specified by inheritance allowed. Otherwise if the URL is not in the trusted URLs, checking whether the URL is in the restricted URLs is performed as indicated in a decision block 406. If true, approval is set to restricted, the current trust base is set to null and inheritance left is set to −1 as indicated in a block 408. Checking for show message is performed as indicated in a decision block 410. If true, a message that the URL is restricted is displayed as indicated in a block 412. When the URL is not in the restricted list, checking whether the URL was selected as a hyperlink and inheritance left is greater than zero is performed as indicated in a decision block 414. If true, approval is set to approved and inheritance left is decremented as indicated in a block 416. Thus inheritance left indicates the number of links away from the current trust base that may yet be taken. Otherwise, approval is set to monitored, current trust base is set to URL and inheritance left is set to zero. Monitored URLs do not have any known trust that can be extended to other URLs. A record history according to profile settings routine is performed as indicated in a block 422. A push on stack operation is performed as indicated in a block 424 where the current URL, the trust base, and inheritance left are saved so they can be restored by selecting the back as shown in block 214 and the operations return as indicated in a block 426.

It will be obvious to those knowledgeable in the art that other measures could be added to determine if a URL was restricted, such as words or word fragments in the URL or the HTML content, without departing from the spirit and scope of the invention.

Figure 5:
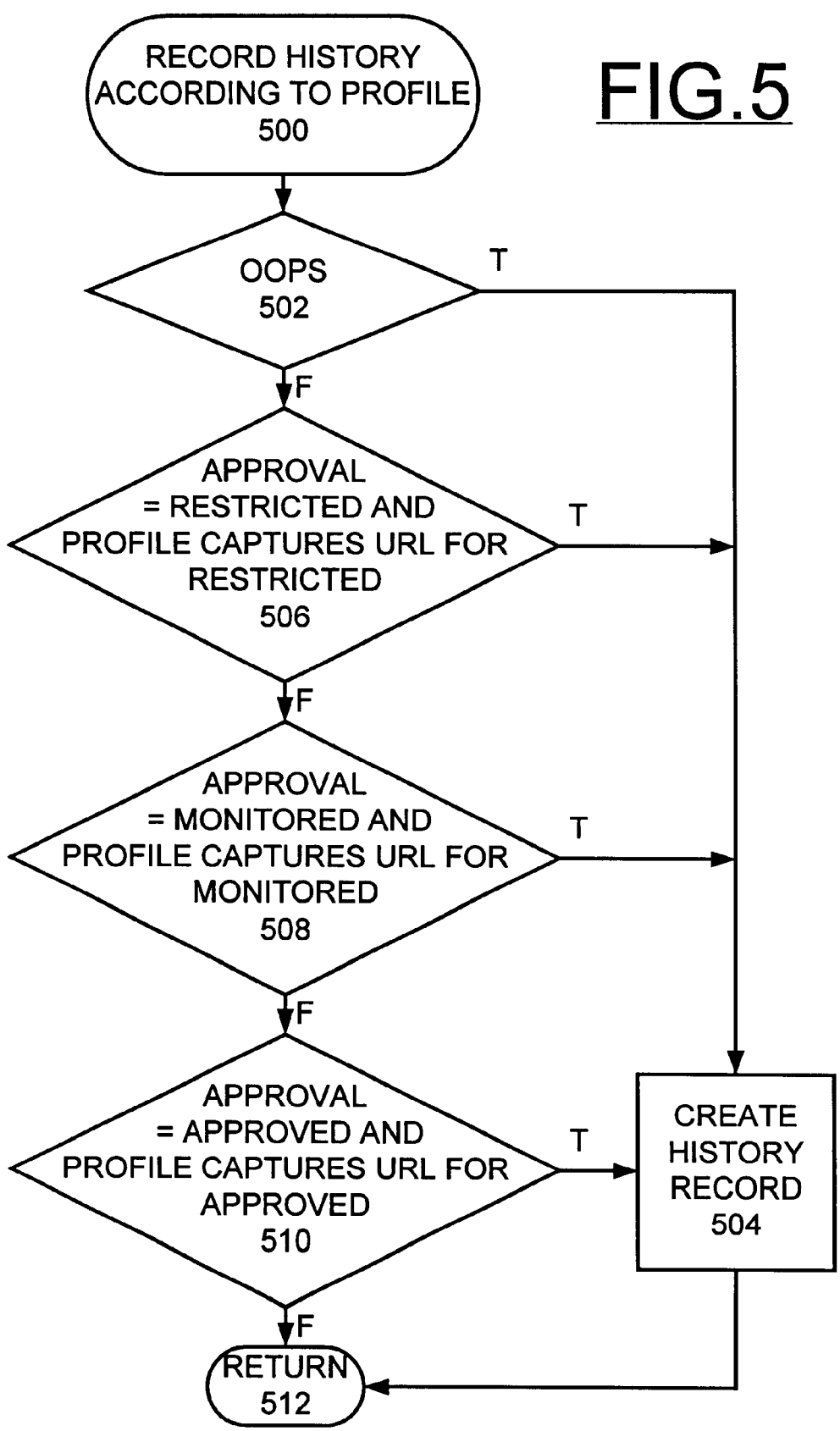

Referring now to FIG. 5, there are shown illustrative steps for the record history according to profile settings routine starting at block 500. Checking for an OOPS event as the reason for recording history is performed as indicated in a decision block 502. When found, a history record is created as indicated in a block 504. When an OOPS event is not the reason, then checking for approval level equal to restricted and the profile set to capture for restricted URLs is performed as indicated in a decision block 306. If true, then a history record is created at block 504. Otherwise, checking for approval level equal to monitored and whether the profile requires monitored URLs to be recorded is performed as indicated in a decision block 508. If true, then a history record is created at block 504. Otherwise, checking for approval level equal to approved and whether the profile for approved URLs indicates they should be captured is performed as indicated in a decision block 510. If true, then a URL history record is created at block 504. If false and after a URL history record is created at block 504, the sequential operations return as indicated in a block 512.

Figure 6A:
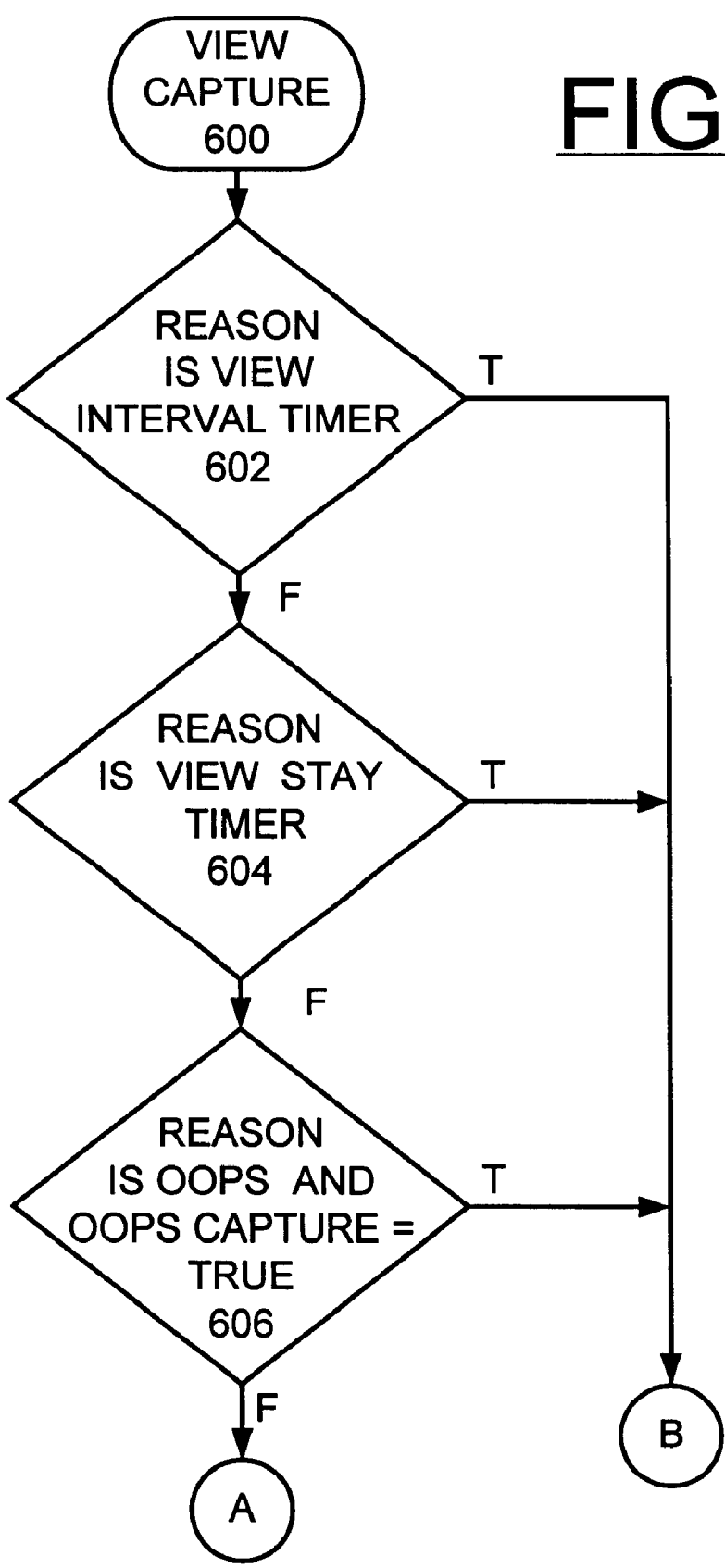
Figure 6B:
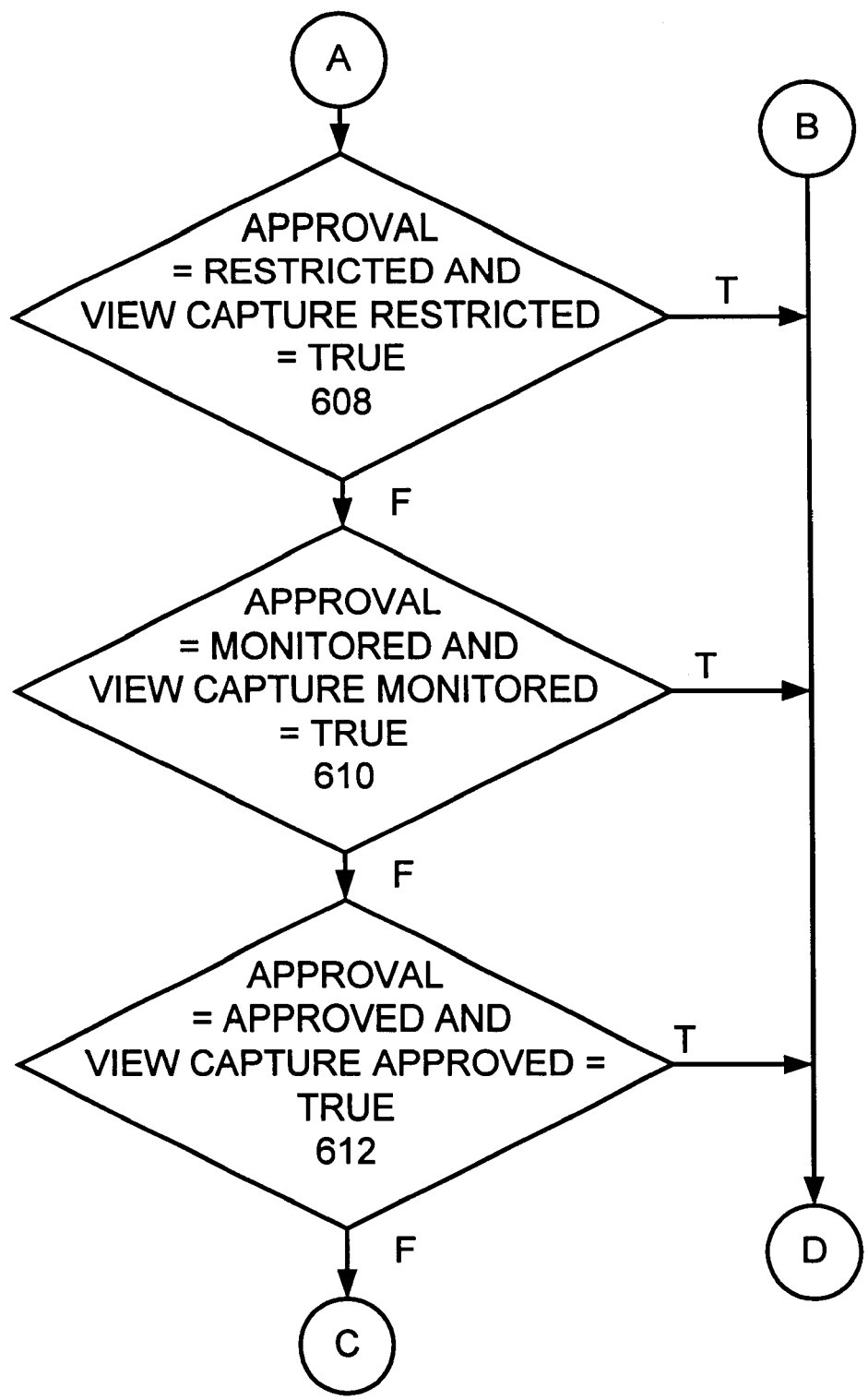
Figure 6C:
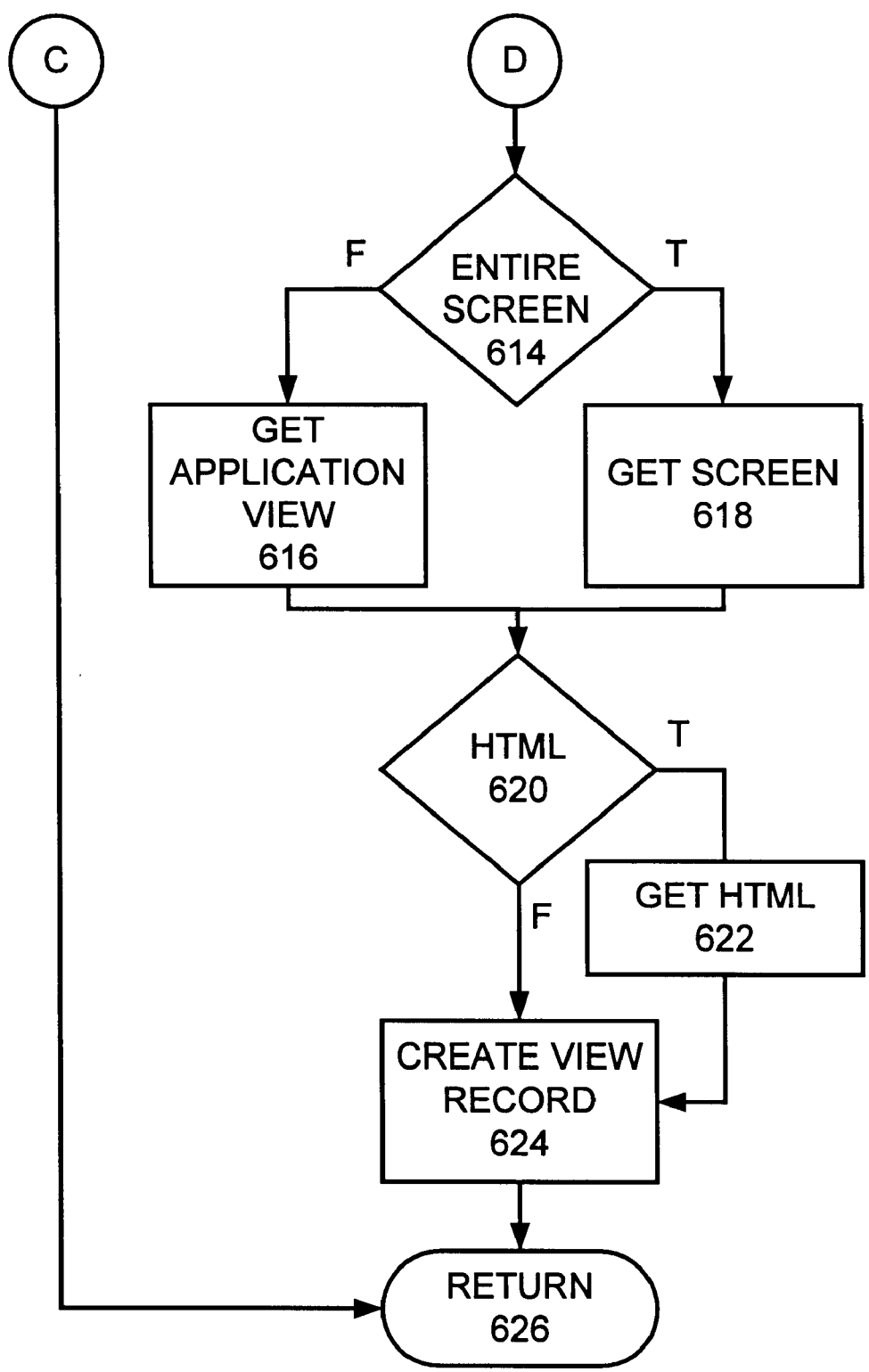

Referring now to FIGS. 6A, 6B, and 6C, there are shown illustrative steps for the view capture routine starting at block 600. Checking whether the reason for capture is view interval timer is performed as indicated in a decision block 602. The view interval timer fires at a consistent periodic interval set in the profile, so that view images are captured on a regular basis, for example every 15 seconds. If not the view interval timer, checking whether the reason is view stay timer is performed as indicated in a decision block 604. The view stay timer fires when the user has been at a URL an extended period, perhaps indicating the user is interested in the material. If not the view stay timer, checking whether the reason is an OOPS event and OOPS capture is true in the user profile is performed as indicated in a decision block 606. Referring to FIG. 6B, if not OOPS event or OOPS capture is not true, checking whether approval level for this URL is restricted and view capture restricted URLs is true is performed as indicated in a decision block 608. If false, then checking whether approval level for URL is monitored and view capture monitored is true is performed as indicated in a decision block 610. If not approval is monitored and view capture monitored is true, then checking whether approval level is approved and view capture approved is true is performed as indicated in a decision block 612.

Referring to FIG. 6C, with a true at any of the decision blocks 602, 604, 606, 608, 610, 612 of FIGS. 6A, 6B, then checking for an entire screen setting is performed as indicated in a decision block 614. If not an entire screen setting, an application view is obtained as indicated in a block 616, which is just the browser or application portion of the screen. If a parent is monitoring content only, the application image is usually sufficient, but if the parent is watching for downloads or file transfer activity or software installation, capturing the entire screen may be valuable. With an entire screen selection, the entire screen is captured as indicated in a block 618. Checking for keep HTML is performed as indicated in a decision block 620. If true, the HTML is obtained as indicated in a block 622. HTML is optionally kept because some content may be hard to read after image compression. Further stored HTML can be searched for word content. If not HTML or after the HTML is obtained, then a view history record is created as indicated in a block 624.

Figure 13:
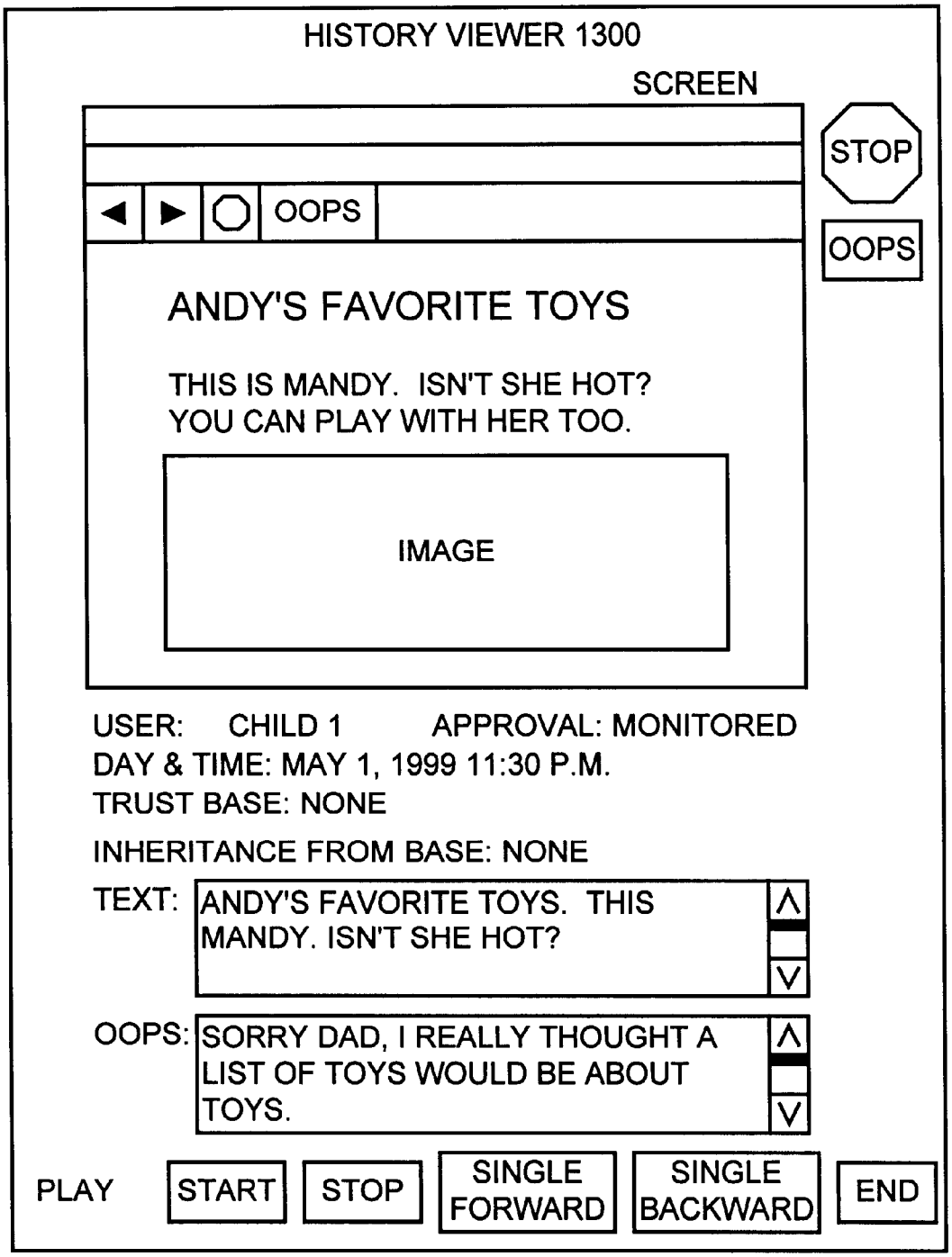
FIG. 13 is a diagram illustrating a history viewer in accordance with the preferred embodiment.

Referring to FIGS. 7A and 7B and FIG. 13, there are shown the URL history record 136 and the view history record 138 in accordance with the preferred embodiment. FIG. 13 illustrates a history viewer 1300 in accordance with the preferred embodiment. URL history record 136 includes multiple fields comprising a URL 702, a time stamp 704, an OOPS entry 706, an inheritance from base 707, a trust base entry 708, an approval 710 and a reviewed 712. The view history record 138 includes multiple fields comprising a URL 722, a time stamp 724, an image 726, an inheritance from base 727, a trust base entry 728, an HTML 730, a reviewed 732, an OOPS entry 734, and an approval 736. The URL history record 136 and view history record 138 are viewed by the history viewer 1300.

FIGS. 8A and 8B respectively illustrate a URL stack 800 and a memory 810 in accordance with the preferred embodiment. The URL stack 800 includes a URL 802, a trust base 804 and an inheritance left 806. Memory 810 includes a current trust base 812 and an inheritance left 814.

Figure 9:
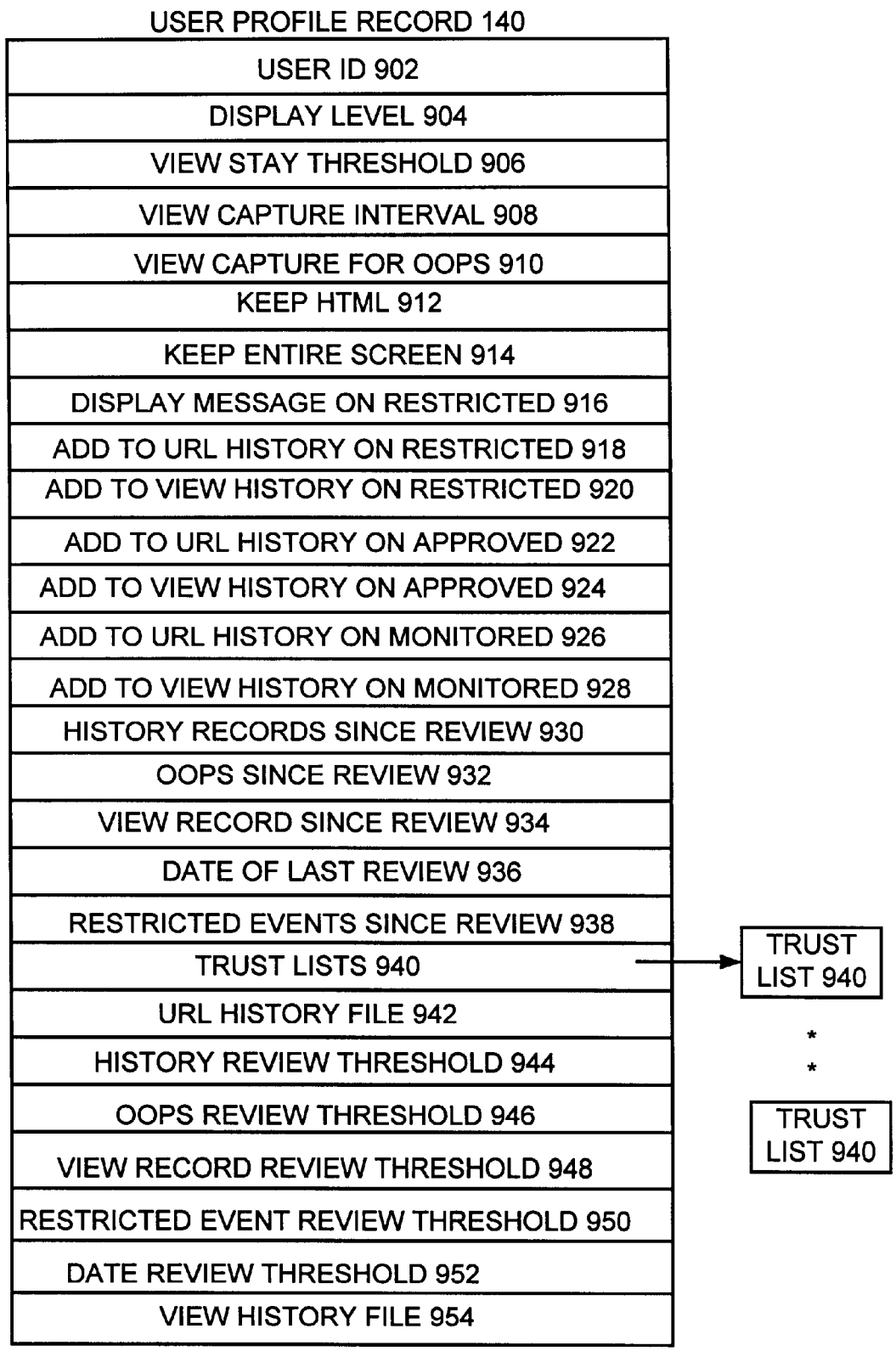
FIG. 9 is a diagram illustrating a user profile record in accordance with the preferred embodiment.

Referring now to FIGS. 9 and 11, there are shown the user profile record 140 and a user profile editor 1110. FIG. 9 illustrates the user profile record 140 in accordance with the preferred embodiment. FIG. 11 illustrates the user profile editor 1100 in accordance with the preferred embodiment. User profile record 140 includes a user ID 902, for example, CHILD 1 as shown in FIG. 11 and a display level 904 including approved only, monitored and restricted as shown in FIG. 11. User profile record 140 includes a view stay threshold 906, a view capture interval 908, a view capture for OOPS 910, a keep HTML 912, a keep entire screen 914 and a display message on restricted 916 that are illustrated in the user profile editor 1100 of FIG. 11. User profile record 140 includes add to URL history on restricted 918, add to view history on restricted 920, add to URL history on approved 922, add to view history on approved 924, add to URL history on monitored 926, and add to view history on monitored 928. User profile record 140 includes history records since review 930, OOPS events since review 932, view record since review 934, date of last review 936, and restricted events since review 938. User profile editor 1100 is used to set these measures for review as illustrated in FIG. 11.

Referring also to FIGS. 12 and 13, there are shown a trust list editor 1200 and a history viewer 1300 in accordance with the preferred embodiment. User profile record 140 includes multiple trust lists 940 including both trusted sites and restricted sites. Trust list editor 1200 is used to add, remove and edit both trusted and restricted URLs. User profile record 140 includes a URL history file 942, a history review threshold 944, an OOPS event review threshold 946, a view record review threshold 948, a restricted event review threshold 950, a date review threshold 952, and a view history file 954, which is set in the review section of the user profile interface 1100. The view history file 954 and URL history file 942 are illustrated at the lower portion of the user profile editor 1100 in FIG. 11. The history viewer 1300 of FIG. 13 is used for URL history and view history monitoring including images 726 of the view history record 138. FIG. 13 shows a sample review of a view capture caused by an OOPS event. The screen seen by the child is shown. The browser with its OOPS button is shown in the displayed screen capture along with the offending URL display. Information on the user, the calculated approval, date and time and the trust base URL is shown. The text of the URL is shown as well as the child's explanation. The review tool allows replay of the screen like a slide show, since the eye can pick out images at a very fast speed. Options to stop on a single frame are provided.

Referring now to FIGS. 10A and 10B, there are shown a trusted URL record 1000 and a restricted URL record 1010 in accordance with the preferred embodiment. The trusted URL record 1000 includes a URL 1002, an inheritance allowed 1004 which is the number of links away from this URL allowed, a reviewer 1006, and an updated 1008. The restricted URL record 1010 includes a URL 1012 and a reviewer 1014.

Referring to FIGS. 11, 12 and 13, the user profile editor 1100, the trust list editor 1200 and the history viewer 1300 are used by the administrator or parent to set measures for review and for monitoring.

Figure 14:
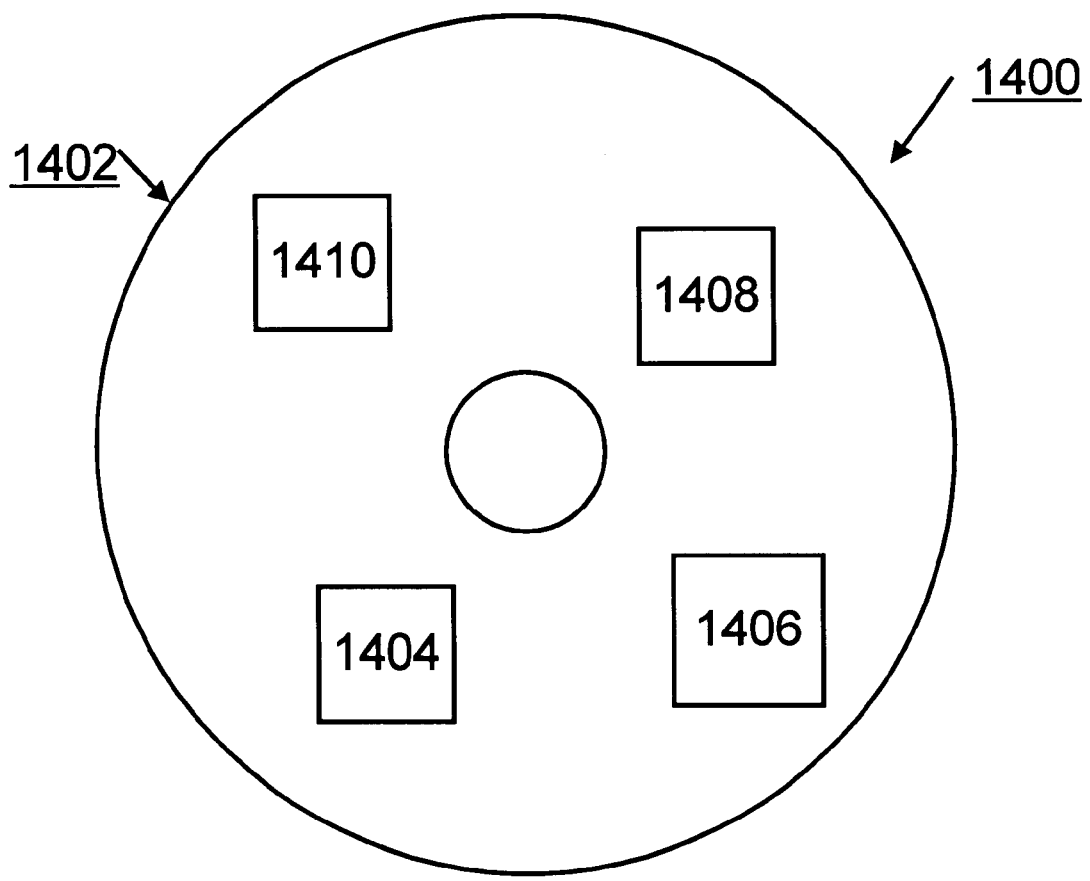
FIG. 14 is a block diagram illustrating a computer program product in accordance with the preferred embodiment.

Referring now to FIG. 14, an article of manufacture or a computer program product 1400 of the invention is illustrated. The computer program product 1400 includes a recording medium 1402, such as, a floppy disk, a high capacity read only memory in the form of an optically read compact disk or CD-ROM, a tape, a transmission type media such as a digital or analog communications link, or a similar computer program product. Recording medium 1402 stores program means 1404, 1406, 1408, 1410 on the medium 1402 for carrying out the methods for implementing parental supervision for Internet browsing of the preferred embodiment in the system 100 of FIGS. 1A and 1B.

A sequence of program instructions or a logical assembly of one or more interrelated modules defined by the recorded program means 1404, 1406, 1408, 1410, direct the computer system 100 for implementing parental supervision for Internet browsing of the preferred embodiment.

While the present invention has been described with reference to the details of the embodiments of the invention shown in the drawing, these details are not intended to limit the scope of the invention as claimed in the appended claims.

What is claimed is:

1. A computer implemented method for implementing supervision functions for Internet browsing comprising the steps of:
   maintaining a user profile record; said user profile record including a display level; said display level including an approved option, a monitored option and a restricted option;
   identifying a universal resource locator (URL);
   determining approval for said Identified URL; and
   displaying said URL according to a selected display level in said user profile record and said determined approval for said URL; and responsive to said monitored option and said determined approval for said URL being approved or monitored, displaying said URL; and
   capturing at least one application image being displayed for said URL and creating a view record; said view record including said URL and said at least one captured application image.

2. A computer implemented method for implementing supervision functions for Internet browsing as recited in claim 1 wherein said step of displaying said URL includes the step of creating a history record according to said user profile record.

3. A computer implemented method for implementing supervision functions for Internet browsing as recited in claim 1 wherein said user profile record includes a URL history capture, said URL history capture including an approved option, a monitored option and a restricted option and defined threshold values.

4. A computer implemented method for implementing supervision functions for Internet browsing as recited in claim 1 wherein said user profile record includes at least one trust list; said trust list including a list of approved web sites.

5. A computer implemented method for implementing supervision functions for Internet browsing as recited in claim 1 wherein said user profile record includes a trusted URL; and at least one other URL being allowed to inherit trust from said trusted URL; said at least one other URL including each URL directly linked to said trusted URL.

6. A computer implemented method for implementing supervision functions for Internet browsing as recited in claim 1 wherein said step of maintaining said user profile record includes the step of displaying a user profile editor and receiving a user administrator selections for said user profile record.

7. A computer implemented method for implementing supervision functions for Internet browsing as recited in claim 1 wherein said step of determining approval for said identified URL includes the steps of checking a trusted list for said identified URL and responsive to finding said identified URL in said trusted list, setting approval to approved.

8. A computer implemented method for implementing supervision functions for Internet browsing as recited in claim 7 further includes the step of creating a history record according to said user profile record.

9. A computer implemented method for implementing supervision functions for Internet browsing as recited in claim 1 wherein said step of determining approval for said Identified URL includes the steps of checking a trusted list for said identified URL, responsive to not finding said identified URL in said trusted list, checking a restricted list.

10. A computer implemented method for implementing supervision functions for Internet browsing as recited in claim 9, responsive to not finding said identified URL in said restricted list, checking for said URL selected as a hyperlink and checking an inheritance left value.

11. A computer implemented method for implementing supervision functions for Internet browsing as recited in claim 10, further includes the step of creating a history record responsive to said user profile record.

12. A computer implemented method for implementing supervision functions for Internet browsing as recited in claim 1 wherein said step of creating said view record includes the steps of checking said user profile record for an entire screen selection and responsive to said entire screen selection, loading said entire screen.

13. A computer implemented method for implementing supervision functions for Internet browsing as recited in claim 1 wherein said step of creating said view record includes the steps of identifying a timer event and responsive to said timer event, capturing said view record.

14. A computer implemented method for implementing supervision functions for Internet browsing as recited in claim 1 includes the steps of receiving an explanation from a monitored user, and creating a view record and capturing said explanation.

15. A computer program product for implementing supervision functions for Internet browsing, said computer program product including a plurality of computer executable instructions stored on a computer readable medium, wherein said instructions, when executed by said computer, cause the computer to perform the steps of:
   displaying a user profile editor and receiving administrative settings for a user profile record; said user profile record including a display level: said display level including an approved option, a monitored option and a restricted option;
   loading said user profile record for Internet browsing;
   identifying a universal resource locator (URL);
   determining approval for said identified URL;
   displaying said URL according to a selected display level in said user profile record and said determined approval for said URL; and
   capturing at least one application image being displayed for said URL; and creating a view record; said view record including said URL and said at least one captured application image displayed for said URL.

16. A computer program product for implementing supervision functions for Internet browsing as recited in claim 15 wherein said instructions, when executed by said computer, further cause the computer to perform the steps of:

displaying a trust list editor and receiving administrative selections to add, remove and edit a list of trusted URLs.

17. A computer program product for implementing supervision functions for Internet browsing as recited in claim 16 wherein said instructions, when executed by said computer, further cause the computer to perform the steps of:

displaying a trust list editor and receiving administrative selections to add, remove and edit a list of restricted URLs.

18. A computer program product for implementing supervision functions for Internet browsing as recited in claim 15 wherein said instructions, when executed by said computer, further cause the computer to perform the steps of:

displaying a history viewer for reviewing URL history records.

19. A computer program product for implementing supervision functions for Internet browsing as recited in claim 15 wherein said instructions, when executed by said computer, further cause the computer to perform the steps of:

displaying a history viewer for reviewing view history records.

* * * * *